(12) United States Patent
Abe et al.

(10) Patent No.: US 8,455,106 B2
(45) Date of Patent: Jun. 4, 2013

(54) ACRYLIC RUBBER-METAL COMPOSITE

(75) Inventors: Katsumi Abe, Kanagawa (JP); Kiyofumi Fukasawa, Kanagawa (JP)

(73) Assignee: NOK Corporation, Tokyo (JP)

( * ) Notice: Subject to any disclaimer, the term of this patent is extended or adjusted under 35 U.S.C. 154(b) by 710 days.

(21) Appl. No.: 12/226,042

(22) PCT Filed: Apr. 12, 2007

(86) PCT No.: PCT/JP2007/058037
§ 371 (c)(1),
(2), (4) Date: Oct. 6, 2008

(87) PCT Pub. No.: WO2007/119769
PCT Pub. Date: Oct. 25, 2007

(65) Prior Publication Data
US 2009/0311543 A1 Dec. 17, 2009

(30) Foreign Application Priority Data

Apr. 13, 2006 (JP) .................................. 2006-110523

(51) Int. Cl.
*B32B 15/08* (2006.01)
(52) U.S. Cl.
USPC ......... 428/457; 428/343; 428/344; 428/355 R
(58) Field of Classification Search
None
See application file for complete search history.

(56) References Cited

U.S. PATENT DOCUMENTS

| 4,160,757 | A | * | 7/1979 | Honda et al. | 524/432 |
| 5,268,404 | A | * | 12/1993 | Mowrey | 524/236 |
| 5,354,805 | A | * | 10/1994 | Treat et al. | 524/510 |
| 2008/0115888 | A1 | * | 5/2008 | Husemann et al. | 156/307.5 |

FOREIGN PATENT DOCUMENTS

| JP | 02-063733 | 3/1990 |
| JP | 10-121020 | 5/1998 |
| JP | 11-001672 | 1/1999 |
| JP | 11-061053 | 3/1999 |
| JP | 2000-017247 | 1/2000 |
| JP | 2004-277435 | 10/2004 |
| JP | 2005-226064 | 8/2005 |

OTHER PUBLICATIONS

Eguchi et al., JP 04013790, "Vulcanizing Adhesive Composition" (Human Translation).*

* cited by examiner

*Primary Examiner* — Callie Shosho
*Assistant Examiner* — Cheng Huang
(74) *Attorney, Agent, or Firm* — Brinks Hofer Gilson & Lione

(57) ABSTRACT

An acrylic rubber-metal composite, which comprises a metal, (a) an undercoat adhesive layer comprising phenol resin and epoxy resin, (b) an overcoat adhesive layer comprising phenol resin, halogenated polymer, and a metal oxide, and (c) an acrylic rubber layer, the layers (a), (b) and (c) being successively laid on the surface of the metal, having not only a distinguished initial adhesiveness, but also a good water resistance, where the acrylic rubber is bonded to the metal without surface treatment of the metal such as a chemical treatment, e.g. zinc phosphate treatment, etc., a blast treatment, or a primer treatment.

6 Claims, No Drawings

ACRYLIC RUBBER-METAL COMPOSITE

RELATED APPLICATIONS

The present application is a 35 U.S.C. §371 national stage filing of International Patent Application No. PCT/JP2007/058037, filed Apr. 12, 2007, to which priority is claimed under 35 U.S.C. §120 and through which priority is claimed under 35 U.S.C. §119 to Japanese Priority Patent Application No. 2006-110523, filed Apr. 13, 2006.

TECHNICAL FIELD

The present invention relates to an acrylic rubber-metal composite, and more particularly to an acrylic rubber-metal composite having a distinguished water resistance.

BACKGROUND ART

The acrylic rubber-metal composite, which comprises a metal and an acrylic rubber as vulcanization bonded to each other, has been so far used to produce oil-resistant and heat-resistant parts, for example, oil seals. Such parts have been sometimes exposed to contamination of service oil with water, depending on service locations, and thus a water resistance has now been further indispensable in addition to the afore-mentioned characteristics.

In the vulcanization bonding of a metal and an acrylic rubber, processes for coating to surface-treated metals, for example, as surface-treated by a chemical treatment such as zinc phosphate treatment, etc., a blast treatment, or a primer treatment, with a phenol resin-based adhesive are usually used to enhance chemical and physical bonding forces. However, it is difficult to apply such surface treatments to surface roughness-requiring positions. Furthermore, the surface treatment is a prerequisite processwise for the bonding treatment, resulting in an increase in process steps. Thus, it is preferable to bond a metal to an acrylic rubber without application of the surface treatment.

Patent Literature 1: JP-A-10-121020
Patent Literature 2: JP-A-11-001672
Patent Literature 3: JP-A-11-061053
Patent Literature 4: JP-A-2000-017247

Direct application of so far used ordinary phenol resin-based adhesives to metals without surface treatment, for example, a chemical treatment such as zinc phosphate treatment, etc., a blast treatment, or a primer treatment, still now suffers from such problems as low tight-adhesion to metals and hard attainment of even an initial adhesiveness.

DISCLOSURE OF THE INVENTION

Problem to be Solved by the Invention

An object of the present invention is to provide an acrylic rubber-metal composite having not only a distinguished initial adhesiveness, but also a good water resistance, based on bonding of an acrylic rubber to a metal without surface treatment, for example, a chemical treatment such as zinc phosphate treatment, a blast treatment, or a primer treatment.

Means for Solving the Problem

The object of the present invention can be attained by an acrylic rubber-metal composite, which comprises a metal, (a) an undercoat adhesive layer comprising a phenol resin and an epoxy resin, (b) an overcoat adhesive layer comprising a phenol resin, a halogenated polymer, and a metal oxide, and (c) an acrylic rubber layer, the layers (a), (b) and (c) being successively laid on the metal.

Effect of the Invention

The present acrylic rubber-metal composite is based on bonding of an acrylic rubber to a metal without surface treatment, for example, a chemical treatment such as zinc phosphate treatment, etc., a blast treatment, or a primer treatment, and thus can be produced not only processwise advantageously, but also can attain a distinguished effect, such as limitless application to surface roughness-requiring positions. Furthermore, not only a distinguished initial adhesiveness, but also a good water resistance of the present composite can assure effective use as mechanical parts at such positions where oil will be easily contaminated with water.

BEST MODES FOR CARRYING OUT THE INVENTION

Metal for use in the present invention includes mild steel, stainless steel, aluminum, aluminum die cast, etc. in different shapes, depending on the kinds of metal products, such as sheet shapes, including rolled steel plate, bar shapes, etc. In every case, the metal can be used without surface treatment.

The undercoat adhesive comprising a phenol resin and an epoxy resin for use in the present invention includes, for example, Metalock PH-50, a product of Toyo Kagaku Kenkyusho, Ltd., a vulcanizable adhesive composition comprising a novolak-type epoxy resin, a novolak-type phenol resin derived from p-substituted phenol, and an imidazole compound as a curing catalyst, as disclosed in Japanese Patent No. 2,870,118, more specifically a vulcanizable adhesive composition, which comprises 100 parts by weight of a novolak-type epoxy resin, about 30 to about 60 parts by weight of a novolak-type phenol resin having a melting point of about 100° to about 150° C., and a molecular weight of about 1,000, derived from p-substituted phenol, and about 0.1 to about 5 parts by weight of an imidazole compound including, for example, 2-methylimidazole, 2-ethyl-4-methylimidazole, 2-undecylimidazole, 2-heptadecylimidazole, 2-phenylimidazole, 1-benzylimidazole, 1-benzyl-2-methylimidazole, 2,4-diamino-6-[2-methylimidazoline-(1)]-ethyl-s-triazine, etc., and the like. The undercoat adhesive compositions can be used as such or upon preparation into solutions in an organic solvent capable of dissolving or dispersing each of the composition components.

Phenol resin for use in the overcoat adhesive includes novolak-type phenol resin or resol-type phenol resin, and it is preferable from the viewpoint of assured reactivity with acrylic rubber to use both type phenol resins, and is more preferable to use a blend comprising 50-90% by weight of novolak-type phenol resin and 50-10% by weight of resol-type phenol resin.

Novolak-type phenol resin can be obtained by reaction of phenol with formaldehyde in a molar ratio of about 0.1 to about 1.0 in the presence of an acidic catalyst such as hydrochloric acid, oxalic acid, etc. Resol-type phenol resin can be obtained by condensation reaction of phenol with formaldehyde in a molar ration of about 1 to about 3 in the presence of an alkali catalyst such as ammonia, hydroxides of alkali metal or magnesium, etc. In any case, any of phenols can be used so long as they have two or three substitutable nuclear hydrogen atoms at the o-position, p-position or both o- and p-positions with respect to the phenolic hydroxyl group, for example, phenol, m-cresol, p-cresol, p-t-butylphenol, p-phenylphenol, bisphenol A, etc.

Halogenated polymer for use in the overcoat adhesive includes polymers of dichlorobutadiene, polymers of brominated dichlorobutadiene, chlorinated polychloroprene, chlorinated rubber, etc.

Metal oxide for use in the overcoat adhesive includes a titanium oxide, a divalent metal oxide having an acid-accepting effect such as zinc oxide, magnesium oxide, calcium oxide, etc., and a mixture of a titanium oxide and a divalent metal oxide. Preferably a mixture of a titanium oxide and a divalent metal oxide is used.

Among the essential components of above overcoat adhesive, the phenol resin is used in a proportion of 45-75% by weight, preferably 55-70% by weight, the halogenated polymer in a proportion of 5-25% by weight, preferably 8-20% by weight, and the metal oxide in a proportion of 10-30% by weight, preferably 13-29% by weight, each on the basis of solid matters in the overcoat adhesive. When the halogenated polymer is used in a proportion of more than 25% by weight, the bonding to acrylic rubber will be unsatisfactory, whereas in a proportion of less than 5% by weight, the bonding to a metal substrate will be unsatisfactory, giving rise to peeling. This is unpreferable. When the metal oxide is used in a proportion of more than 30% by weight, the stability of the prepared solution will be lowered, and the bonding to acrylic rubber will be also unsatisfactory, whereas in a proportion of less than 10% by weight the bonding to acrylic rubber will be unsatisfactory. This is unpreferable.

The overcoat vulcanizable adhesive composition comprising the afore-mentioned essential components can be used as a solution upon dilution with an organic solvent to a concentration of the essential components of about 3 to about 20% by weight, as total solid matters. The organic solvent is not particularly limited, so long as it can stably dissolve or disperse the phenol resin, halogenated polymer and metal oxide. Generally, alcohols such as methanol, isopropanol, etc., ketones such as methyl ethyl ketone, methyl isobutyl ketone, etc., esters such as ethyl acetate, propyl acetate, etc., and ethers such as ethyl cellosolve, 2-ethoxyethanol, 2-butoxyethanol, etc. can be used as an organic solvent.

In preparation of an acrylic rubber-metal composite, at first an undercoat adhesive is applied to a metal surface to a coat film thickness of about 1 to about 30 μm by any of a coating methods such as a spray method, a dipping method, a brush coating method, a roll coater method, etc., followed by drying at room temperature or in an warm air atmosphere, and then by baking at about 100° to about 250° C. for about 0.1 to about 2 hours, thereby forming an undercoat adhesive layer. Then, an overcoat adhesive is applied to the surface of the under coat adhesive layer in the same coating manner at the same coating temperature for the same coating time as in the case of coating the undercoat adhesive, thereby forming an overcoat adhesive layer. Then, acrylic rubber compounds are bonded to the resulting adhesive layer, and vulcanized under pressure at about 180° to about 230° C. for about 2 to about 20 minutes, thereby forming an acrylic rubber-metal composite having an acrylic rubber layer in a thickness of about 0.5 to about 10 mm.

Acrylic rubber compounds having any of vulcanizable groups such as active chlorine, epoxy group, carboxylic group, etc. as vulcanizable sites can be used as unvulcanized acrylic rubber compounds, for example, in the following formulation:

(One Example of Acrylic Rubber Compound Formulation)

|  | Parts by weight |
|---|---|
| Active chlorine-containing acrylic rubber | 100 |
| HAF carbon black | 70 |
| Silica powder | 5 |
| Microcrystalline wax (Sunnock, a product of Ouchi-Shinko Chemical Co.,) | 2 |
| Stearic acid | 1 |
| 4,4'-bis(2,2'-dimethylbenzyl) diphenylamine | 2 |
| Sulfur | 0.3 |
| Sodium stearate | 3.5 |

Acrylic rubber having vulcanizable groups includes acrylic rubber copolymers comprising alkyl acrylate having an alkyl group of 1-8 carbon atoms and/or alkoxyalkyl acrylate having an alkoxyalkylene group of 2-8 carbon atoms as the main component, which is copolymerized with about 0.1 to about 10% by weight, preferably about 1 to about 5% by weight, of a vulcanizable group-containing monomer, for example, (a) Reactive halogen-containing vinyl monomers
2-chloroethylvinyl ether, vinyl chloroacetate, allyl chloroacetate, reaction products of glycidyl compound such as glycidyl(meth)acrylate, allylglycidyl ester, etc. with monochloroacetic acid, or the like
(b) Epoxy group-containing vinyl monomers
the afore-mentioned glycidyl compounds, etc.
(c) Carboxyl group-containing vinyl monomers
(meth)acrylic acid, maleic acid mono-lower alkyl ester, fumaric acid mono-lower alkyl ester, etc.
(d) Hydroxyl group-containing vinyl monomers
2-hydroxylethyl acrylate, etc.
(e) Amide group-containing vinyl monomers
(f) Diene-based monomers A vulcanizing agent can be used in view of kinds of vulcanizable groups.

EXAMPLES

The present invention will be described in detail below, referring to Examples.

Example 1

|  | Parts by weight |
|---|---|
| Phenol resin/epoxy resin-based adhesive (Metalock PH-50) | 100 |
| Methyl ethyl ketone | 200 |

An undercoat adhesive solution made from the afore-mentioned components was applied to a defatted cold-rolled steel sheet surface to a coat film thickness of 5 μm, dried at room temperature, and baked at 200° C. for 10 minutes, whereby an undercoat adhesive layer was formed.

Following to the forming of an undercoat adhesive layer,

|  | Parts by weight |
|---|---|
| Novolak-type phenol resin (Resitop PSF-2803, a product of Gun-ei Chemical Co.,) | 60 |

-continued

| | Parts by weight |
|---|---|
| Resol-type phenol resin (Resitop PL-2208, a product of Gun-ei Chemical Co., solid matter concentration: 63%) (Solid matter 40) | 63.5 |
| Chlorinated rubber (CAS No. 9006-03-5) | 25 |
| Zinc oxide | 20 |
| Titanium oxide | 20 |
| Methyl isobutyl ketone | 1461.5 | then, an overcoat adhesive composition made from the aforementioned components was applied to the undercoat adhesive layer formed on the steel sheet to a coat film thickness of 10 μm, dried at room temperature, and baked at 150° C. for 15 minutes.

Unvulcanized acrylic rubber compounds of the aforementioned formulation example was bonded to the resulting adhesive-coated steel sheet, and vulcanized under pressure at 200° C. for 5 minutes. The resulting bonded article was subjected to a 90° peeling test according to JIS-K6256 corresponding to ASTM D429-03, where the initial adhesiveness or the hot water-resistant adhesiveness after dipping in hot water at 80° C. for 70 hours were investigated by measuring a percent retained rubber area and by determining peeled interface sites. The results showed that the percent retained rubber area was all 100% at the initial test and after the hot water dipping test. That is, both of the initial adhesiveness and the hot water-resistant adhesiveness were found satisfactory. In the determination of peeled interface sites at the initial test and after the hot water dipping test, no peeled interface sites were found at all between the metal sheet and the adhesive layer and between the adhesive layer and the acrylic rubber layer.

Example 2

In Example 1, the amount of chlorinated rubber was changed to 15 parts by weight, and the amount of methyl isobutyl ketone was changed to 1371.5 parts by weight in the overcoat adhesive composition. In both of the initial test and the hot water dipping test conducted in the same manner as in Example 1, the percent retained rubber area was found all 100%. In the determination of peeled interface sites at the initial test and after the dipping test, no peeled interface sites were found at all between the metal sheet and the adhesive layer and between the adhesive layer and the acrylic rubber layer.

Example 3

In Example 1, the amount of chlorinated rubber was changed to 35 parts by weight, and the amount of methyl isobutyl ketone was changed to 1551.5 parts by weight in the uppercoat adhesive composition. In both of the initial test and the hot water dipping test conducted in the same manner as in Example 1, the percent retained rubber area was found all 100%. In the determination of peeled interface sites at the initial test and after the dipping test, no peeled interface sites were found at all between the metal sheet and the adhesive layer and between the adhesive layer and the acrylic rubber layer.

Example 4

In Example 1, the amounts of zinc oxide and that of titanium oxide were changed to 10 parts by weight, respectively, and the amount of methyl isobutyl ketone was changed to 1281.5 parts by weight in the over layer adhesive composition. In both of the initial test and the hot water dipping test conducted in the same manner as in Example 1, the percent retained rubber area was found all 100%. In the determination of peeled interface sites at the initial test and after the dipping test, no peeled interface sites were found at all between the metal sheet and the adhesive layer and between the adhesive layer and the acrylic rubber layer.

Example 5

In Example 1, the amounts of zinc oxide and that of titanium oxide were changed to 25 parts by weight, respectively, and the amount of methyl isobutyl ketone was changed to 1551.5 parts by weight. In both of the initial test and the hot water dipping test conducted in the same manner as in Example 1, the percent retained rubber area was found all 100%. In the determination of peeled interface sites at the initial test and after the dipping test, no peeled interface sites were found at all between the metal sheet and the adhesive layer and between the adhesive layer and the acrylic rubber layer.

Comparative Example 1

In Example 1, no chlorinated rubber was used, and the amount of methyl isobutyl ketone was changed to 1236.5 parts by weight in the overcoat adhesive composition. The percent retained rubber area at the initial test was found 100%, but after the hot water dipping, peeling took place between the metal sheet and the undercoat adhesive layer, and the percent retained rubber area was found 80%.

Comparative Example 2

In Example 1, neither zinc oxide nor titanium oxide was used, and the amount of methyl isobutyl ketone was changed to 1101.5 parts by weight. The percent retained rubber areas at the initial test and after the hot dipping test were found 70% and 60%, respectively. In both cases, peeling took place between the acrylic rubber layer and the overcoat adhesive layer.

Comparative Example 3

In Example 1, no undercoat adhesive was used. The percent retained rubber area at the initial test was found 100%, but after the hot water dipping test, peeling took place between the metal sheet and the adhesive layer, and the percent retained rubber area was found 0%.

INDUSTRIAL UTILITY

The present acrylic rubber-metal composite can be effectively used as composite parts such as oil seal, etc., particularly as oil-resistant and heat-resistant oil seals in engine and transmission systems.

The invention claimed is:
1. An acrylic rubber-metal composite, which comprises a metal, (a) an undercoat adhesive layer comprising phenol resin and epoxy resin, (b) an overcoat adhesive layer comprising a novolak phenol resin, a resol phenol resin or a mixture thereof, the total amount of novolak phenol resin and resol phenol resin together being 45-75% by weight, 5-25% by weight of halogenated polymer, and a metal oxide mixture of titanium oxide and a divalent metal oxide, the total amount of titanium oxide and divalent metal oxide together being

10-30% by weight, the weight percentages being on the basis of total solid matters, and (c) an acrylic rubber layer, the layers (a), (b) and (c) being successively laid on the surface of the metal.

2. An acrylic rubber-metal composite according to claim 1, wherein the metal is a surface-untreated metal.

3. An acrylic rubber-metal composite according to claim 1, wherein the metal is a metal sheet.

4. An acrylic rubber-metal composite according to claim 1, wherein the mixture in the overcoat adhesive layer comprises 50-90% by weight of novolak phenol resin and 50-10% by weight of resol phenol resin.

5. An acrylic rubber-metal composite according to claim 1, wherein the halogenated polymer in the overcoat adhesive composition is a polymer of dichlorobutadiene, a polymer of brominated dichlorobutadiene, chlorinated polychloroprene, or chlorinated rubber.

6. An oil seal comprising the acrylic rubber-metal composite according to claim 1.

\* \* \* \* \*